US006753083B2

(12) United States Patent
Mistry et al.

(10) Patent No.: US 6,753,083 B2
(45) Date of Patent: Jun. 22, 2004

(54) PARTICLES

(75) Inventors: Kishor Kumar Mistry, Bradford (GB); Janine Andrea Preston, Leeds (GB); Kenneth Charles Symes, Keighley (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 09/982,607

(22) Filed: Oct. 18, 2001

(65) Prior Publication Data

US 2002/0058732 A1 May 16, 2002

Related U.S. Application Data

(60) Provisional application No. 60/246,046, filed on Nov. 6, 2000.

(51) Int. Cl.⁷ .................................................. B32B 5/66
(52) U.S. Cl. ............... 428/402; 428/402.2; 428/402.21; 428/402.22; 428/402.24; 428/403; 428/407; 427/212; 427/213.3; 427/213.31; 427/213.32; 427/213.34
(58) Field of Search ............................. 428/402, 402.2, 428/402.21, 402.22, 402.24, 403, 407; 427/212, 213.3, 213.31, 231.32, 231.34

(56) References Cited

U.S. PATENT DOCUMENTS

| 3,676,363 A |   | 7/1972  | Moiser ........................ 252/316 |
| 4,322,311 A |   | 3/1982  | Lim et al.                              |
| 4,324,683 A |   | 4/1982  | Lim et al.                              |
| 4,708,816 A |   | 11/1987 | Chang et al. ........... 252/186.25     |
| 5,070,136 A |   | 12/1991 | Dersch et al. ............... 524/555   |
| 5,324,445 A |   | 6/1994  | Langley et al.                          |
| 5,460,817 A |   | 10/1995 | Langley et al. .............. 424/408   |
| 5,492,646 A |   | 2/1996  | Langley et al.                          |
| 5,723,059 A |   | 3/1998  | Snyder, Jr. .................... 252/70 |
| 6,046,177 A | * | 4/2000  | Stella et al. ................... 514/58 |
| 6,225,372 B1 | * | 5/2001 | Lykke et al. ................. 523/201  |
| 6,287,558 B1 | * | 9/2001 | Lanza et al. ................ 424/93.7  |
| 6,359,031 B1 | * | 3/2002 | Lykke et al. ................. 523/201  |
| 6,500,459 B1 | * | 12/2002 | Chhabra et al. ............ 424/474    |

FOREIGN PATENT DOCUMENTS

| EP | 0 356 239 | 2/1990  |
| EP | 0 697 423 | 2/1996  |
| WO | 97/24179  | 7/1972  |
| WO | 92/20771  | 11/1992 |
| WO | 99/01533  | 1/1999  |

\* cited by examiner

*Primary Examiner*—Leszek B Kiliman
(74) *Attorney, Agent, or Firm*—JoAnn Villamizar

(57) ABSTRACT

A particulate composition comprising particles having a core comprising a hydrophobic polymer within a shell, characterised in that the shell comprises a semi-permeable membrane. Particulate composition can be used for making a stable dispersion of particles uniformly distributed throughout a first hydrophobic liquid, wherein the particles comprise a core within a shell and the core comprises a hydrophobic polymer into has been imbibed a second hydrophobic liquid, Compositions can be used to encapsulate active substances and may be used in sustained release mechanisms.

40 Claims, No Drawings

PARTICLES

This application claims the benefit of Provisional Application No. 60/246,046 filed Nov. 6, 2000.

The present invention relates to particulate compositions which comprise particles that have a hydrophobic polymeric core within a shell, which comprises a membrane and processes for making said particles. The invention also relates to stable uniform dispersions of polymer particles and methods for making same. The invention further relates to methods of controlling the release of active substances from particles.

It is known to make particles having a core shell configuration. One method involves coacervation of a polymer around the core. Methods of forming a coacervate coating from a polymer solution around an aqueous core, and which are suitable for the manufacturer of micro capsules that can be included in a liquid detergent concentrate, are described in, for instance, the EP-A-356239 and WO-A92/20771. It is difficult to obtain by this technique a product in which the enzyme is retained satisfactorily in the particles while in the concentrate but is reliably released from the particles when the concentrate is diluted into wash water.

WO-A-97/24179 describes a particulate composition comprising particles having a hydrophilic core within a shell comprising a membrane comprising an association product of (a) an IFC condensation product formed by reaction between a first IFC reactant having at least two first condensation groups and a second IFC reactant having at least two second condensation groups, and (b) an amphipathic polymeric stabiliser which will concentrate at the interface between oil and water and which has recurring hydrophobic groups and recurring reactive hydrophilic groups which associate with the second condensation groups U.S. Pat. No. 4,708,816 describes a method for preparing microcapsules which are stable in that the microcapsules have a controlled density to be closely similar to that of an aqueous bleaching solution into which they are dispersed. The microcapsules comprise an inner core and a polymeric outer shell which is used to vary the density to be compatible with the liquid medium into which the particles are dispersed. This process therefore requires that the shell wall needs to be synthesised precisely such that the density of the microcapsules will match the density of a given liquid medium. In practice it may be difficult to consistently produce microcapsules with a precise density by a microencapsulation process in which the density of the microcapsule is determined solely by the amount of density adjusting polymer in the outer shell. Thus the carrier phase is inevitably more dense that the wall forming material.

U.S. Pat. No. 3,676,363 describes producing weighted microcapsules, by incorporating a finely divided weighting compound in the capsular material. The amount of weighting compound incorporated will depend upon the desired weight of the capsules, which depends upon the specific gravity of the liquid. This reference appears to deal specifically with increasing the density of particles for use with high density liquids such as brine.

U.S. Pat. No. 5,723,059 discloses improving a dispersion of a microencapsulated phase change material in a poly alpha olefin electronic coolant fluid by modifying the density of the fluid to match the density of the dispersed particles. This would only be applicable to systems in which altering the density of the oil based continuous phase is feasible.

It is also known to prepare microparticles which have pre-determined densities in order to form a uniform dispersion in a hydrocarbon liquid.

However, there exists a need for particles which can readily and consistently form a uniform dispersion in a liquid. There also exists a need for an improved method of forming such dispersions in which particles or microcapsules are uniformly distributed, and which avoids any surface stratifying of particles, "creaming" and also avoids sedimentation of the particles. In particular there is a need to achieve this for dispersions in non-aqueous liquids, especially hydrocarbons.

Furthermore there is also a need for improvements to particles containing active substances and improved methods for releasing said active substances.

According to a first aspect of the present invention we provide a particulate composition comprising particles having a core within a shell, in which the core comprises a hydrophobic polymer, characterised in that the shell comprises a semi-permeable membrane.

It is important to the functionality of the particles of the present invention that the core comprises at least some hydrophobic polymer. In one form of the invention the core comprises an aqueous liquid containing particles of hydrophobic polymer particles dispersed throughout the aqueous liquid. In another form the core may comprise agglomerates of hydrophobic polymer particles. In a further form the core comprises a matrix of hydrophobic polymer. In all of these forms of the invention, the core is regarded as a hydrophobic polymeric core.

The particles may comprise a core which is essentially a single intact matrix of polymer core material. Alternatively the core material comprises voids or vesicles distributed throughout the matrix polymer. In addition it may also be possible for the core to comprise other components, which are for instance distributed throughout the hydrophobic polymeric core.

Desirably the hydrophobic polymeric core is any suitable material that is capable of absorbing, imbibing or dissolving in a hydrophobic or water immiscible liquid.

In one form of the invention the core also comprises a hydrophobic liquid. Desirably the hydrophobic liquid has been absorbed or imbibed by the hydrophobic polymeric core material.

This preferred form of the invention relates to particles which comprise a core that contains absorbed or imbibed hydrophobic liquid and a semipermeable membrane shell wherein the core comprises i) an aqueous liquid containing dispersed hydophobic polymer particles, ii) agglomerates of hydrophobic polymer particles or iii) a hydrophobic polymer matrix. In each case the hydrophobic liquid is desirably absorbed by or imbibed into the hydrophobic polymer. This preferred form of the invention may be achieved by dispersing the particles in said hydrophobic liquid for sufficient time to allow the hydrophobic liquid to pass through the semi-permeable membrane and into the hydrophobic polymeric core.

In one preferred form the particles comprise an active substance. The active substance can be any active ingredient that is either released slowly as part of a controlled release mechanism or alternatively may perform some function by remaining within the particles. Such an active substance which remains within the particle could be a pigment, dye or colour former and the particle may be used in a colour forming application. Typically the active substance may be any selected the group consisting of fragrance oils, lubricant oils, essential oils, wax inhibitors, corrosion inhibitors, colorants, oxygen scavengers, antioxidants and vitamins.

The hydrophobic polymeric core material may be any polymeric material which exhibits hydrophobic properties.

It may be a natural polymer but preferably it is a synthetic polymer. Desirably the polymer can be a condensation polymer, for instance a polyester or polyamide. The polymer may be a condensation polymer of formaldehyde for instance a phenolic resin. Other suitable polymers include polyurethanes. Preferably the hydrophobic polymer core is formed by polymerisation of ethylenically unsaturated monomer or monomer blend. Generally the monomer or blend of monomers are hydrophobic, but may include some hydrophilic monomer, provided that the resulting polymer is hydrophobic. By hydrophobic we mean that the hydrophobic monomer has a solubility in water of less than 5 g in 100 cm$^3$ of deionised water at 25° C. By hydrophilic monomer we mean that the hydrophilic monomer has a solubility in water of at least 5 g in 100 cm$^3$ of deionised water at 25° C. Typically the monomers include monomers which do not possess ionic or hydrophilic functional groups. Suitable monomers are for instance acrylonitrile, ethylenically unsaturated carboxylic acid esters, styrenes vinyl esters of saturated carboxylic acids, for instance vinyl acetate. Preferably the hydrophobic polymeric core is formed from a hydrophobic monomer or blend of monomers comprising $C_4$ to $C_{30}$ alkyl esters of ethylenically unsaturated carboxylic acid, more preferably $C_4$ to $C_{30}$ alkyl esters of (meth)acrylic acid. Particularly desirable monomers include 2-ethyl hexyl acrylate, lauryl acrylate, stearyl acrylate, n-butyl methacrylate and isobutyl methacrylate or mixtures of these monomers. The monomer mixture may also contain polyethylenically unsaturated monomers which serve to cross-link the polymeric core material. Alternatively it may be desirable to effect cross-linking by use of other cross-linking agents which contain two or more functional groups, which are capable of bridging two or more polymer chains. Preferably, however, where cross-linking agents are used, they are poly ethylenically unsaturated monomers which are compatible with the monomer mixture and bring about cross-link during polymerisation. Suitable cross-linking monomers include divinyl benzene, ethylene glycol diacrylate or penta erithrytol triacrylate etc. The hydrophobic polymer does not dissolve or swell deionised water at 25° C.

The polymeric core material may be formed by any suitable polymerisation process, which provides particles of hydrophobic polymer. The particles of hydrophobic polymer can be conveniently prepared by aqueous emulsion polymerisation for instance as described in EP-A-697423 or U.S. Pat. No. 5,070,136. In a typical polymerisation process the monomer or monomer blend is added to an aqueous phase which contains a suitable amount of emulsifying agent. Typically the emulsifying agent may be any commercially available emulsifying agents suitable for forming aqueous emulsion. Desirably these emulsifying agents will tend to be more soluble in the aqueous phase than in the monomer water immiscible phase and thus will tend to exhibit a high hydrophilic lipophilic balance (HLB). The mechanism of emulsion polymerisation involves transfer of monomer through the aqueous phase to polymerise to polymerise in the micelles and emulsification is therefore not crucial. Polymerisation may then be effected by use if suitable initiator systems, for instance UV initiator or thermal initiator. A suitable techniques of initiating the polymerisation would be to elevate the temperature of the aqueous emulsion of monomer to above 70 or 80° C. and then add between 50 and 1000 ppm ammonium persulphate by weight of monomer.

Alternatively the hydophobic core polymer may be obtained as a commercially available product, for instance Alcomer 274 (Trade Mark of Ciba Specialty Chemicals).

Desirably the hydrophobic polymer is in the form of a dispersion of polymer particles in a liquid medium in which the polymer particles may have an average particle size distribution of below 10 microns. Preferably the average particle size distribution is below 2 microns. Typically the average particle size diameter is above 100 nm and usually between 200 nm and 1 micron, for instance in the range 500 to 750 nm.

The particles of the invention can be made to any suitable size. Generally however the particles have an average particle size diameter below 30 microns, often in the range 0.5 to 30 microns. Preferably the particles will have a particle size below 10 or 20 microns, for instance in the range 750 nm to 2 microns, most preferably around 1 micron.

The composition of the present invention may be prepared by forming a shell around a hydrophobic polymer core material, in which the shell comprises a semi-permeable membrane. Preferably the shell is formed by interfacial polycondensation reaction. This can be achieved by forming mixing a first interfacial polycondensation reactant into a dispersion of the hydrophobic polymer particles in a first liquid medium and then forming a dispersion of the first liquid, containing said polymeric particles in a second liquid medium immiscible with the first liquid. Interfacial polycondensation may be carried out by adding a second interfacial polycondensation reactant which reacts with the first reactant and thereby effecting interfacial polycondensation. The shell that is formed may consist essentially of a single membrane which envelops the core material or alternatively it may be formed from several layers of interfacial polycondensation product and may be in the form of a relatively tough polymeric shell. It is essential to the invention that the shell comprises a semi-permeable membrane. Preferably the whole of this shell is a semi-permeable barrier and may be referred to as a semi-permeable membrane.

By semi-permeable barrier or semi-permeable membrane we mean that the passage of small molecules across the barrier or membrane is possible but large molecules are prevented from crossing. Thus in the present invention relatively small molecules such as oils and other hydrophobic liquids may pass across the semi-permeable barrier into the core, but that the polymeric core material is prevented from escaping. Thus the present invention envisages particles comprising a hydrophobic core surrounded by a semi-permeable shell in which there is a high osmotic potential with respect to a hydrophobic liquid solvent for the polymeric core. This osmotic potential should preferably be relatively high even when relatively large amounts of hydrophobic liquid have been imbibed. Thus in a more preferred form the semi-permeable shell allows the passage of small molecules e.g. the hydrophobic liquid, while preventing the loss of core material and also acts as a physical barrier which limits the amount that the core is able to swell and expand. Thus in this situation the particles may be regarded as fully turgid.

It is also contemplated that the hydrophobic polymeric core material may comprise more than one specific polymeric materials. One way of achieving this would be to use from a blend of different aqueous emulsion hydrophobic polymers in the encapsulation process. The blend of emulsion polymers may then comprise one, two or more different polymers of different hydrophobic polymers and the hydrophobic core material will thus comprise a blend of different hydrophobic polymers. The choice of different hydrophobic entities to include within the core could be designed so that a blend of different hydrophobic liquids may be imbibed. This may be important for hydrophobic liquids such as essential oils, petroleum oils, diesel and crude oil. Thus a cocktail of specific hydrophobic polymeric materials can be selected to provide maximum absorbance capacity for specific mixture of hydrophobic liquids. The choice and proportions of specific core materials will depend upon the composition and characteristics of the hydrophobic liquid to be absorbed.

According to a second aspect of the invention we provide a process for making particles which have a core comprising a hydrophobic polymer within a shell, in which the shell comprises a semi-permeable membrane. Essentially the process involves the steps:

a) dispersing an aqueous emulsion of hydrophobic polymer into a water immiscible liquid containing an emulsifier to form a reverse phase emulsion comprising of an aqueous dispersed phase which contains the hydrophobic polymer, b) inducing interfacial polycondensation of at least one interfacial polycondensation reactant to form a polymeric shell around the hydrophobic polymer, to form a dispersion of the particles, c) optionally subjecting the dispersion of particles to dehydration to remove any residual water from the particles.

Thus where the dehydration step (c) is not employed, the particles thus formed will comprise a shell surrounding a core of aqueous liquid in which particles of hydrophobic polymer are dispersed. Generally the aqueous emulsion polymer produces average particle diameters of below 1 micron, for instance 50 nm to 750 nm, usually 100 nm to 600 nm, preferably 200 nm to 500 nm, especially 300 nm to 400 nm. Generally when the hydrophobic polymer particles contained in the core have average particle size diameters of the same size.

Where the dehydration step (c) is employed the aqueous liquid may be partially or substantially removed. As the water is removed the particles of hydrophobic polymer may coalesce into a substantially intact hydrophobic matrix core. Alternatively the hydrophobic polymer particles may partially coalesce or stick together to form one or more agglomerates of hydrophobic polymer particles. The primary particles of the agglomerates are generally of the same size as produced by the aqueous emulsion polymerisation. The choice of hydrophobic polymer may be chosen according to whether a solid matrix or agglomerates are required. Thus a hydrophobic polymer with a higher softening temperature will tend to form agglomerates, whereas a hydrophobic polymer with a lower softening temperature will tend to coalesce substantially completely to form a single intact matrix.

In an alternative form of the invention the active ingredient is present in water immiscible liquid in accordance with the second aspect of the invention. In this form of the invention water immiscible liquid containing the active are absorbed or imbibed into the hydrophobic polymer. Thus the shell is formed around the hydrophobic polymer containing water immiscible liquid and active. After the shell wall has been formed, the dehydration step may be employed, wherein water is removed from the core, resulting in a core comprising an intact hydrophobic polymer matrix or agglomerated particles of hydrophobic polymer, wherein the core contains an active ingredient.

In this alternative form the active ingredient may be dissolved in the water immiscible liquid, in which case the active ingredient may also be imbibed by the hydrophobic polymer, resulting in the active being distributed throughout the hydrophobic polymer. Instead the active ingredient may be dispersed rather than dissolved in the water-immiscible liquid. In this case the active ingredient may be water soluble and thus would not absorbed by the hydrophobic polymer, but instead would tend to be entrapped with the hydrophobic polymer in the core surrounded by the shell. Such water soluble active ingredients may instead be dissolved in the aqueous phase of the aqueous emulsion of hydrophobic polymer. Thus the active ingredient would tend to precipitate when the dehydration step is applied and thus the active becomes entrapped within the voids between the hydrophobic polymer particles. Where the hydrophobic polymer core forms a solid matrix, the water soluble active may be distributed throughout the matrix, for example as a solid physically bound by the hydrophobic polymer.

In a preferred form of this second aspect of the invention the shell is formed by interfacial polycondensation reaction of a substantially oil soluble first interfacial polycondensation reactant having at least two first condensation groups with a substantially water soluble second interfacial polycondensation reactant having at least two second condensation groups, the process comprising combining the second interfacial polycondensation reactant with the aqueous emulsion of hydrophobic polymer, prior to conducting step (a) of the process, then blending in the first interfacial polycondensation reactant to induce the interfacial polycondensation reaction of step (b) and allowing reaction to occur between the first and second interfacial polycondensation reactants to form the shell.

The water immiscible liquid is desirably an oil suitable for emulsion polymerisation. Preferably the water immiscible liquid is a hydrocarbon. Typically the liquid may be for instance as described in EP-A-150933. However, it may be desirable to use especially pure water immiscible liquids. It may be desirable to use a high purity medicinal grade white oil. One particularly preferred medicinal grade white oil is Kristol M 14 (RTM). The water-immiscible liquid may be selected so that it is readily absorbed by hydrophobic polymer. However, it may be advantageous for the hydrophobic polymer to absorb or imbibe the water immiscible liquid during the shell forming stage.

As discussed with regard to the first aspect of the invention the hydrophobic polymeric core material may be any polymeric material which exhibits hydrophobic properties. Desirably the hydrophobic polymeric core may be capable of absorbing a hydrophobic liquid. Generally the monomer or blend of monomers are hydrophobic, but may include some hydrophilic monomer, provided that the resulting polymer is hydrophobic. Typically the monomers include monomers which do not possess ionic or hydrophilic functional groups. Suitable monomers are for instance acrylonitrile, ethylenically unsaturated carboxylic acid esters, styrenes, vinyl esters of saturated carboxylic acids, for instance vinyl acetate. Preferably the hydrophobic polymeric core is formed from a hydrophobic monomer or blend of monomers comprising $C_4$ to $C_{30}$ alkyl esters of ethylenically unsaturated carboxylic acid, more preferably $C_4$ to $C_{30}$ alkyl esters of (meth)acrylic acid. Particularly desirable monomers include 2-ethyl hexyl acrylate, lauryl acrylate, stearyl acrylate n-butyl methacrylate and isobutyl methacrylate or mixtures of these monomers. The choice and ratio of monomers comprised in the hydrophobic polymer may be such that the polymer readily absorbs one hydrophobic liquid more readily than another.

The emulsifier used in step (a) of the process may be any suitable emulsifier, especially emulsifiers typically used in reverse phase emulsion polymerisation. Preferably the emulsifier is a polymeric emulsion stabiliser and possess both hydrophilic and lipophilic moieties, such that it associates with the interface and helps stabilise the dispersed phase and prevent agglomeration of the particles. A particularly preferred polymeric emulsifier is an oil soluble or oil swellable amphipathic polymeric stabiliser.

In addition to stabilising the dispersed phase and preventing agglomeration of particles, it may be desirable for the stabiliser to actually take part in the shell building process. Such a reactive stabiliser would contain suitable reactive groups which enabled it to participate in the interfacial polycondensation reaction but as the same time would not impair its function as a stabiliser. Thus the emulsifier may be a stabiliser which comprises recurring hydrophobic groups and recurring reactive hydrophilic groups that associate with the second condensation groups of the second interfacial polycondensation reactant before the blending with the first interfacial polycondensation reactant.

The first interfacial polycondensation reactant should be blended into the dispersion in any suitable way that will allow the formation of an membrane without impairing stability. This may be achieved by blending of the first interfacial polycondensation reactant is conducted by mixing the dispersion and the first interfacial polycondensation reactant under conditions wherein the weight ratio of dispersion to first interfacial polycondensation reactant remains substantially constant through the blending process. In this way the process of shell formation during the process tends to be constant, which tends to provide more consistently sizes particles and a more stable system that avoids the occurrence of agglomerates. It is highly desirable that the particles of the invention remain as individual freely dispersed particles comprising an intact shell surrounding a core.

In other preferred processes of the invention, the resultant dispersion of particles in water immiscible liquid is treated by adding a water miscible organic liquid, (which may for instance be a surfactant) to the dispersion and distilling off the water immiscible liquid, thereby forming a dispersion of the particles in the water miscible organic is liquid. If desired, the dispersion in water immiscible liquid and/or water miscible liquid may be subjected to distillation so as to render it substantially anhydrous.

The processes of the invention, and especially those utilising an emulsifier which is a polymeric stabiliser that associates in some manner with the second reactant before the reaction between the first and second reactants, allow the production of more uniform particles at satisfactory concentrations and in particular it allows the production a substantially stable dispersion of small encapsulated particles (at least 90% by weight below 30 $\mu$m). They can beneficially influence the production of the shell by interfacial polycondensation. For instance the amount of either or both of the reactants required to obtain a shell of defined properties can be reduced by optimising the polymeric stabiliser and its amount. Further the particles made using the stabiliser can be dispersed stably into another liquid The processes of the invention may comprise the subsequent step of distilling off most or all of the water from the core composition until the particles comprise a substantially anhydrous hydrophobic polymeric core encapsulated within the interfacial polycondensation polymer shell. The distillation step is preferably is carried out under conditions of reduced pressure. This type of distillation is often referred to as azeotropic distillation as some of the organic liquid is usually distilled off with the water, although the water and organic liquid do not necessarily form an azeotrope.

Preferably, the invention is applied to the production of fine particles, generally with at least 90% by weight of the particles having a dry size below 30 $\mu$m. The invention not only permits the production of a relatively high concentration (for instance 25 to 50% by weight of the final product) of such particles but it also permits the production of these particles in substantially individual form and substantially stably dispersed in the water immiscible liquid.

By referring to the dry size of the particles we mean the size of the particles measured after the dispersion has been distilled so as to provide a substantially anhydrous core, for instance having a total water content (based on the total weight of the particles) of below 20% and usually below 10% by weight. However if, in any particular process, it is not possible to dry the dispersion then the dry size can be estimated from measurement of the wet size.

The process of the invention is suitable to make particles any suitable size. Generally however the particles have an average particle size diameter below 30 microns, often in the range 0.5 to 30 microns. Preferably the particles will have a particle size below 10 or 20 microns, for instance in the range 750 nm to 2 microns, most preferably around 1 micron.

By saying that the particles are substantially individually and stably dispersed in the water immiscible liquid we mean that the total number of particles (including agglomerated particles) above 30 microns is below 10% by weight and that preferably no settlement of particles occurs but if any does occur then the settled particles can very easily be redispersed by gentle stirring. Preferably the particles have a dry size at least 80% (and preferably at least 90%) by weight below 15 microns or 20 microns and so again the number of agglomerates having a size greater than 15 microns or 20 microns should be low. Preferably the dry size is at least 70% (and preferably 80% or 90%) by weight below 10 microns. The particles can be as small as, for instance, 50% below 1 micron but preferably at least 50% and most preferably at least 70% by weight and have a size in the range 1–5 microns.

Another way of defining the size is that the mean particle size (on a weight average basis) is preferably below 20 microns and most preferably below 10 microns often in the range of 1–5 microns.

The particles have to be made initially as a water-in-oil dispersion in a water immiscible liquid. This liquid is preferably free of halogenated hydrocarbons (such as chloroform) and is preferably a hydrocarbon.

When carrying out the initial manufacture of the particles having an aqueous core comprising dispersed hydrophobic polymer particles, an aqueous composition which is to provide the core material is dispersed into a water-immiscible non-aqueous liquid. A substantially water-soluble interfacial polycondensation reactant having low or no oil solubility is included in the dispersion. In some cases, certain components (eg some IFC reactant or a pH adjusting agent) to be incorporated in the shell or core of the particles may be introduced before, during or after encapsulation. If desired, the substantially water-soluble reactant is mixed into the aqueous core composition before that is dispersed in the water-immiscible liquid.

The reactant and, optionally, other appropriate components (e.g. a pH adjusting agent such as sodium hydroxide) can be mixed into a pre-formed dispersion of the aqueous composition in the water-immiscible liquid. In some instances, the interfacial polycondensation reactant can be water in the aqueous core composition. In some instances shell formation may be formed by two or more sequential reactions.

It is generally preferred that the water soluble reactant should have sufficient solubility in the oil phase that a small proportion of it will dissolve in the oil phase or that it will, at least, migrate to the interface between the oil and water phases. This promotes the desired association between the stabiliser and the substantially water soluble reactant.

Preferably the water-soluble interfacial polycondensation reactant is an amine, the oil soluble interfacial polycondensation reactant is an acid or acid derivative, and the condensation polymer is a polyamide. More preferably the water-soluble interfacial polycondensation reactant is diethylene triamine.

A preferred oil soluble interfacial condensation reactant is terephthaloyl chloride. In another preferred system the process includes a polymeric emulsifier which has pendant carboxylic groups, the water soluble second interfacial polycondensation reactant is an amine.

Generally when the emulsifier is polymeric it is preferred for it to be a random copolymer formed by copolymerising a mixture of ethylenically unsaturated hydrophilic and ethylenically unsaturated hydrophobic monomers. It is particularly desirable for the polymeric emulsifier to be a random copolymer of at least one ionic ethylenically unsaturated monomer with at least one non-ionic water insoluble ethylenically unsaturated monomer. Desirably the ionic monomer may be an anionic monomer selected from acrylic acid, methacrylic acid and maleic acid (or anhydride). The non-ionic monomer may be a water insoluble or relatively water insoluble monomer, preferably selected from styrenes and fatty alkyl esters of ethylenically unsaturated carboxylic acid.

A particularly advantageous polymeric emulsifier is one which becomes covalently bonded on to the outer surface of the particles. Thus it would be important for such a polymeric stabiliser to contain suitable reactive groups. Typically such a polymeric emulsifier may have reactive groups which are selected from epoxide or hydroxyl and the covalent linkage is an ether, or the reactive groups are amino groups and the covalent linkage is an amide, or the reactive groups are carboxylic free acid or anhydride or acid halide (or salt) and the covalent linkage is an ester or amide.

The polymeric emulsifier may be a copolymer of hydrophilic monomer units comprising dicarboxylic anhydride units, and hydrophobic monomer units. Typically the polymeric emulsifier is an addition polymer of hydrophobic monomer units and hydrophilic monomer units wherein the hydrophobic monomer units comprise carboxylic free acid or acid salt units and reactive monomer units selected from glycidyl monomer units and anhydride monomer units.

A third aspect of the present invention relates to a stable dispersion of particles uniformly distributed throughout a first hydrophobic liquid, wherein the particles comprise a core within a shell and the core comprises a hydrophobic polymer into has been imbibed a second hydrophobic liquid, characterised in that the shell comprises a semi-permeable membrane.

We have found that particles according to the first aspect of the invention in which a second hydrophobic liquid has been imbibed are capable of forming a stable dispersion in a first hydrophobic liquid, in which the particles are uniformly distributed. We have found that the particles, when comprising an imbibed hydrophobic liquid, particularly when the particles are in the form of turgid capsules are able to form stable dispersion which do not agglomerate or settle out over prolonged periods. The particles may have any suitable size but preferably the particles have an average particle size diameter below 30 microns, often in the range 0.5 to 30 microns. More preferably the particles will have a particle size below 10 or 20 microns, for instance in the range 750 nm to 2 microns, most preferably around 1 micron.

Especially stable dispersions can be formed according to this third aspect of the invention when the first and second liquids have approximately the same density. Preferably the first and second hydrophobic liquids are the same.

This aspect of the invention is particularly for liquid based systems in which it is important to have a stable uniform distribution of particles. For instance there are many applications in which particles or capsules are employed as carriers in liquid mediums for active substances. Thus in a preferred form of the invention we provide a stable dispersion of particles which comprise an active substance.

The active substance can be any active ingredient that is either released slowly as part of a controlled release mechanism or alternatively may perform some function by remaining within the particles. Such an active substance which remains within the particle could be a pigment, dye or colour former and the particle may be used in a colour forming application. Typically the active substance include for instance fragrance oils, lubricant oils, essential oils, colour forming chemicals, odoriferous chemicals, semiochemicals, herbicides, pesticides, antimicrobials and catalysts. Printing and imaging actives for carbonless copy paper, such as inks, toners and colorants may be entrapped. Other actives include industrial adhesives, sealants, fillers, paints, catalysts, blowing agents, solvents. Suitable actives also include antioxidants and/or oxygen scavenger. A particularly suitable antioxidant especially for use in lubricating oils is Irganox L57 (RTM). Another active is in dye transfer catalysts or bleach accelerator, for instance used in a detergent composition. Agrochemicals, such as herbicides, insecticides, antifouling, repellents, fertiliser may also be encapsulated by the technique. Food and feed actives, for instance, aromas, flavours, preservatives, nutrients may also be usefully encapsulated for later controlled release. The present invention may also be suitably used for encapsulating and controlled release of pharmaceuticals for sustained or long lasting drug delivery and vaccine delivery. The invention may be useful in cosmetic and various health and beauty products and may also be used in the preparation of household products such as soaps, detergents and brighteners.

When the active ingredient is a colourant it may be any colorant, for instance a dye, pigment or lake. Typically suitable colorants include any organic or inorganic pigment or colorant approved for use in cosmetics by CTFA and the FDA such as lakes, iron oxides, titanium dioxide, iron sulphides or other conventional pigments used in cosmetic formulations. Examples of the pigment include an inorganic pigment such as carbon black, D&C Red 7, calcium lake, D&C Red 30, talc Lake, D&C Red 6, barium lake, Russet iron oxide, yellow iron oxide, brown iron oxide, talc, kaolin, mica, mica titanium, red iron oxide, magnesium silicate and titanium oxide; and organic pigment such as Red No 202, Red No 204, Red No 205, Red No 206, Red No 219, Red No 228, Red No 404, Yellow No 205, Yellow No 401, Orange No 401 and Blue No 404. Examples of oil soluble dyes include Red No 505, Red No 501, Red No 225, Yellow No 404, Yellow No 405, Yellow No 204, Orange No 403, Blue No 403, Green No 202 and Purple No 201. Examples of vat dyes are Red No 226, Blue No 204 and Blue No 201. Examples of lake dye include various acid dyes which are laked with aluminium, calcium or barium.

Conventional dyes may also be used and may be either oil or water soluble. Preferably the colorant is an aqueous solution of a water soluble dye. Suitable dyes for the present invention include FD & C Blue No 11, FD & C Blue No 12, FD &C Green No 13, FD & C Red No 13, FD & C Red No 140, FD&C Yellow No. 15, FD&C Yellow No. 16, D&C Blue No. 14, D&C Blue No. 19, D&C Green No. 15, D&C Green No. 16, D&C Green No. 18, D&C Orange No. 14, D&C Orange No. 15, D&C Orange No. 110, D&C Orange No. 111, D&C Orange No. 117, FD&C Red No. 14, D&C Red No. 16, D&C Red No. 17, D&C Red No. 18, D&C Red No. 19, D&C Red No. 117, D&C Red No. 119, D&C Red No. 121, D&C Red No. 122, D&C Red No. 127, D&C Red No. 128, D&C Red No. 130, D&C Red No. 131, D&C Red No. 134, D&C Red No. 139, FD&C Red No. 140, D&C Violet No. 12, D&C Yellow No. 17, Ext. D&C Yellow No. 17, D&C Yellow No. 18, D&C Yellow No. 111, D&C Brown No. 11, Ext. D&C Violet No. 12, D&C Blue No. 16 and D&C Yellow No. 110. Such dyes are well known, commercially available materials, with their chemical structure being described, e.g., in 21 C.F.R. Part 74 (as revised Apr. 1, 1988) and the CTFA Cosmetic Ingredient Handbook, (1988), published by the Cosmetics, Toiletry and Fragrancy Association, Inc. These publications are incorporated herein by reference.

As discussed with regard to the first aspect of the invention the hydrophobic polymeric core material may be any polymeric material which exhibits hydrophobic properties. Desirably the hydrophobic polymeric core may be capable of absorbing a hydrophobic liquid. Generally the monomer or blend of monomers are hydrophobic, but may include some hydrophilic monomer, provided that the resulting polymer is hydrophobic. Typically the monomers include monomers which do not possess ionic or hydrophilic functional groups. Suitable monomers are for instance acrylonitrile, ethylenically unsaturated carboxylic acid esters, styrenes, vinyl esters of saturated carboxylic acids, for instance vinyl acetate.

Preferably the hydrophobic polymeric core is formed from a hydrophobic monomer or blend of monomers comprising $C_4$ to $C_{30}$ alkyl esters of ethylenically unsaturated carboxylic acid, more preferably $C_4$ to $C_{30}$ alkyl esters of (meth)acrylic acid. Particularly desirable monomers include 2-ethyl hexyl acrylate, lauryl acrylate, stearyl acrylate, n-butyl methacrylate and isobutyl methacrylate or mixtures of these monomers.

The composition of the present invention may be prepared by forming a shell around a hydrophobic polymer core material, in which the shell comprises a semi-permeable membrane. Preferably the shell is formed by interfacial polycondensation reaction. This is preferably achieved according to the second aspect of the invention.

In a preferred form of this aspect of the invention the particles have substantially the same density as the first hydrophobic liquid.

As stated previously we also contemplate that the hydrophobic polymeric core material may comprise more than one specific polymeric material. Thus in this form of this invention we provide a stable dispersion of particles comprising a core of a selected at least two different core polymers wherein the number and choice of core materials is selected such that they are capable of absorbing the components of a hydrophobic liquid comprising two or more fractions. Thus particles comprising a range of different $C_6$ to $C_{10}$ alkyl (meth)acrylate polymers will readily absorb all of the components of a petroleum liquid. Thus particles into which has been absorbed said petroleum liquid may be readily will form a stable dispersion in petroleum wherein the particles are uniformly distributed.

The choice and proportions of specific core materials will depend upon the composition and characteristics of the hydrophobic liquid to be absorbed and of the hydrophobic liquid in which the particles are to be dispersed.

According to a fourth of the invention we provide a method of making a stable dispersion of particles that are uniformly distributed throughout a first hydrophobic liquid, comprising the steps of,
(a) forming a particulate composition comprising particles which have a core comprising a hydrophobic polymer within a shell;
(b) dispersing the particles into a second hydrophobic liquid, in which the hydrophobic polymeric core is soluble or swellable and which has approximately the same density as the first hydrophobic liquid;
(c) allowing sufficient time for the second hydrophobic liquid to be imbibed by the hydrophobic polymer in the core;
(d) transferring the particles comprising the second hydrophobic liquid formed in step (c) into the first hydrophobic liquid;
characterised in that the shell comprises a semi-permeable membrane. Preferably the first and second liquids are substantially the same substance.

According to a fifth aspect of the invention we provide a method of controlling the release of an active substance comprising by placing into a substrate or environment into which the active substance is to be released a particulate composition comprising particles having a core comprising a hydrophobic polymer within a shell, said core comprising the active substance, characterised in that the shell comprises a semi-permeable membrane.

Desirably the active substance may be selected from any of the aforementioned actives.

In one form of the invention the active substance is dissolved or dispersed in a hydrophobic liquid and both the liquid and active substance are absorbed into the core. Thus in this instance the choice of hydrophobic liquid would need to be compatible with the active substance. Depending upon the particular active substance and the application it may be necessary to chose a hydrophobic liquid with a particular volatility that can enhance or impede the release of active substance. It another form of the invention the active substance is a hydrophobic liquid.

In one preferred form of this invention the hydrophobic polymer contained in the core may comprise more than one specific polymeric material. Thus in this form of this invention we provide a stable dispersion of particles comprising a core of a selected at least two different core polymers wherein the number and choice of core materials is selected such that they are capable of absorbing the components of a hydrophobic liquid comprising two or more fractions. Thus particles comprising a range of different $C_3$ to $C_{10}$ alkyl (meth)acrylate polymers will readily absorb all of the components of an essential oil. Thus particles into which has been absorbed said essential oil may be applied onto a particular substrate and be released in a controlled way. The choice and proportions of specific core materials will depend upon the composition and characteristics of the hydrophobic liquid to be absorbed and of the active ingredient.

The following are examples which serve to illustrate the invention.

EXAMPLE 1

An aqueous phase was prepared by diluting 5.9 parts of a commercially available 42.6% latex of poly (2-ethylhexyl acrylate) with 44.5 parts of deionised water. To this aqueous mixture was added 1.0 parts of diethylenetriamine (DETA).

Separately, an oil phase was prepared containing 5 parts of 20% amphipathic stabiliser and 145 parts of non-volatile oil.

The aqueous phase was then added slowly to the oil phase under a high shear Silverson mixer and the mixture homogenised to form a water-in-oil emulsion with a mean aqueous droplet sizes of 5 microns.

To the w/o emulsion was added 1.0 g of terephthaloyl chloride (TPC) dissolved in 44 g of non-volatile oil to form a polyamide capsule shell by interfacial polymerisation. The resulting microcapsule mixture was stirred for a further 60 minutes under mechanical agitation to complete the capsule wall forming reaction.

Next, the microcapsules in oil were transferred to a distillation flask and 40 g of a volatile solvent added. The mixture was subjected to vacuum distillation to remove water/volatile solvent mixture. The initial temperature was 25° C. rising to a maximum of 100° C. over the course of distillation. After removal of all volatile solvents, the final product was a suspension of microcapsules in the non-volatile oil. The microcapsules comprises of a swollen polymer core containing imbibe oil and an outer polyamide shell.

EXAMPLE 2

Example 1 was repeated with the exception of a emulsion polymer of poly(lauryl methacrylate) was used in place of the poly (2-ethylhexyl acrylate) emulsion polymer.

EXAMPLE 3

Example 1 was repeated with the exception of a emulsion polymer of poly(stearyl methacrylate) was used in place of the poly (2-ethylhexyl acrylate) emulsion polymer.

EXAMPLE 4

This example illustrates that when microcapsules of Example 1–3 are added and stored in a paraffin oil (Kristol M14 oil) for a period of time, the microcapsules remain dispersed and suspended throughout the oil by self-adjusting their densities.

Separate tests were conducted for each of the above Example 1–3. 0.1 g of microcapsules of were added to 10 g of Kristol M14 oil in a test-tube and mixed until uniformly mixed.

Over a period of 1 month storage at room temperature, the test-tubes containing the microcapsules were monitored for their stability towards settlement or creaming and hence their density adjusting properties.

Over this period, majority of the microcapsules still remain suspended in the liquid oil medium. Also, each sample was examined under a light microscope and the presence of discrete swollen microcapsules was confirmed.

EXAMPLE 5

This example illustrates the entrapment of a particulate material in the core of the hydrophobic particles. C-749 is a saldimine (manganese oxidation) catalyst used in detergent compositions.

The C-749 catalyst (5.0 g) was dispersed into an aqueous mixture of an emulsion polymer comprising of 45.5 g of 35% Alcomer 274 and 45.5 g of water. The pH of the mixture formed was adjusted to pH 10.0 by addition of 1.0M sodium hydroxide solution.

The above aqueous mixture was then added to an oil mixture comprising of 10 g of amphipathic stabiliser and 290 g of Isopar G solvent under a high shear silverson mixer. The resulting mixture was homogenized for 10 minutes to produce a stable water-in-oil emulsion having mean aqueous droplet sizes of 5.0 microns.

The resulting emulsion was transferred to a resin flask equipped with a mechanical paddle stirrer. To this was added 1.3 g of diethylenetriamine; the first wall forming monomer. After stirring the emulsion mixture for 10 minutes, 1.3 g of terephthaloyl chloride dissolved in 100 g of Isopar G solvent was added; the second wall forming monomer. The formed capsule mixture was then warmed to 30° C. and stirred for 2 hours to complete the wall forming reaction.

The microcapsule mixture then was subjected to vacuum distillation to remove the water.

The final product is a suspension of microcapsules in oil. The polyamide shell microcapsules having a hydrophobic polymer core with embedded solid C-749 catalyst.

What is claimed is:

1. A particulate composition comprising particles having a hydrophobic polymeric core within a shell, characterised in that the shell comprises a semi-permeable membrane.

2. A composition according to claim 1 in which the hydrophobic polymer contained in the core absorbs a hydrophobic liquid.

3. A composition according to claim 1 in which the hydrophobic polymer core comprises a hydrophobic liquid.

4. A composition according to claim 2 in which the hydrophobic liquid comprises an active substance.

5. A composition according to claim 1 in which the active substance is selected from the group consisting of fragrance oils, lubricant oils, essential oils, wax inhibitors, corrosion inhibitors, colorants and vitamins.

6. A composition according to claim 1 in which the core is formed from a hydrophobic monomer or blend of monomers comprising $C_4$ to $C_{30}$ alkyl esters of ethylenically unsaturated carboxylic acid.

7. A composition according to claim 1 in which the core comprises at least two different polymeric substances.

8. A composition according to claim 1 in which the shell has been formed by interfacial polycondensation reaction.

9. A composition according to claim 1 in which the average particle diameter 0.5 to 30 microns.

10. A process for making particles having a hydrophobic polymer core within a shell, by the steps,
    a) dispersing an aqueous emulsion of hydrophobic polymer into a water immiscible liquid containing an umulsifier to form a reverse phase emulsion comprising of an aqueous dispersed phase which contains the hydrophobic polymer,
    b) inducing interfacial polycondensation of at least one interfacial polycondensation reactant to form a polymeric shell around the hydrophobic polymer, to form a dispersion of the particles,
    c) optionally subjecting the dispersion of particles to dehydration to remove any residual water from the particles,
characterised in that the shell comprises a semi-permeable membrane.

11. A process according to claim 10 in which the aqueous emulsion or the water immiscible liquid in step a) contains an active ingredient and in which the water immiscible liquid is absorbed by the hydrophobic polymer, wherein resulting particles contain active ingredient entrapped within the core.

12. A process according to claim 10 in which the shell is formed by interfacial polycondensation reaction of a substantially oil soluble first interfacial polycondensation reactant having at least two first condensation groups with a substantially water soluble second interfacial polycondensation reactant having at least two second condensation groups, the process comprising combining the second interfacial polycondensation reactant with the aqueous emulsion of hydrophobic polymer, prior to conducting step (a) of the process, then blending in the first interfacial polycondensation reactant to induce the interfacial polycondensation reaction of step (b) and allowing reaction to occur between the first and second interfacial polycondensation reactants to form the shell.

13. A process according to claim 10 in which the core comprises a hydrophobic polymer formed from a hydrophobic monomer or blend of monomers, comprising $C_4$ to $C_{30}$ alkyl esters of ethylenically unsaturated carboxylic acid.

14. A process according to claim 10 in which the core comprises at least two different polymeric substances.

15. A process according to claim 10 in which the emulsifier is an oil soluble or oil swellable amphipathic polymeric stabiliser.

16. A process according to claim 10 in which the emulsifier is polymeric and comprises recurring hydrophobic groups and recurring reactive hydrophilic groups that associate with the second condensation groups of the second interfacial polycondensation reactant before the blending with the first interfacial polycondensation reactant.

17. A process according to claim 10 in which the blending of the first interfacial polycondensation reactant is conducted by mixing the dispersion and the first interfacial polycondensation reactant under conditions wherein the weight ratio of dispersion to first interfacial polycondensation reactant remains substantially constant through the blending process.

18. A process according to claim 10 in which the water immiscible liquid is a hydrocarbon liquid, substantially free of halogenated hydrocarbon.

19. A process according to claim 10 in which the water-soluble interfacial polycondensation reactant is an amine, the oil soluble interfacial polycondensation reactant is an acid or acid derivative, and the condensation polymer is a polyamide.

20. A process according to claim 10 in which the water-soluble interfacial polycondensation reactant is diethylene triamine.

21. A process according to claim 10 in which the oil soluble interfacial condensation reactant is terephthaloyl chloride.

22. A process according to claim 10 in which the average particle diameter is between 0.5 and 30 microns.

23. A process according to claim 10 in which the emulsifier is polymeric and has pendant carboxylic groups, the second interfacial polycondensation reactant is an amine.

24. A process according to claim 10 in which the emulsifier is a random copolymer formed by copolymerising a mixture of ethylenically unsaturated hydrophilic and ethylenically unsaturated hydrophobic monomers.

25. A process according to claim 10 in which the emulsifier is a random copolymer of at least one ionic ethylenically unsaturated monomer with at least one non-ionic water insoluble ethylenically unsaturated monomer.

26. A process according to claim 25 in which the ionic monomer is selected from acrylic acid, methacrylic acid and maleic acid (or anhydride) and the non-ionic monomer is selected from styrenes and fatty alkyl esters of ethylenically unsaturated carboxylic acid.

27. A process according to claim 10 in which the emulsifier becomes covalently bonded on to the outer surface of the particles.

28. A process according to claim 27 in which the emulsifier comprises reactive groups which are epoxide or hydroxyl and the covalent linkage is an ether, or the reactive groups are amino groups and the covalent linkage is an amide, or the reactive groups are carboxylic free acid or anhydride or acid halide (or salt) and the covalent linkage is an ester or amide.

29. A process according to claim 10 in which the emulsifier is a copolymer of hydrophilic monomer units comprising dicarboxylic anhydride units, and hydrophobic monomer units.

30. A process according to claim 10 in which the emulsifier is an addition polymer of hydrophobic monomer units and hydrophilic monomer units wherein the hydrophobic monomer units comprise carboxylic free acid or acid salt units and reactive monomer units selected from glycidyl monomer units and anhydride monomer units.

31. A process according to claim 10 in which the hydrophobic polymer core absorbs a hydrophobic liquid.

32. A stable dispersion of particles uniformly distributed throughout a first hydrophobic liquid, wherein the particles comprise a core within a shell and the core comprises a hydrophobic polymer into has been imbibed a second hydrophobic liquid, characterised in that the shell comprises a semi-permeable membrane.

33. A dispersion according to claim 32 in which the first and second liquids have approximately the same density.

34. A dispersion according to claim 32 in which the particles comprise an active substance.

35. A dispersion according to claim 34 in which the active substance is selected from the group consisting of fragrance oils, lubricant oils, essential oils, wax inhibitors, colourants, corrosion inhibitors, vitamins, printing and imaging actives for carbonless copy paper, industrial adhesives, sealants, fillers, paints, catalysts, blowing agents, solvents, agrochemicals, food and feed actives, pharmaceuticals, antioxidants, dye transfer catalysts and cosmetics.

36. A dispersion according to claim 32 in which the second hydrophobic liquid comprises two or more components and the core contains at least two different hydrophobic polymers.

37. A stable dispersion of particles uniformly distributed throughout a first hydrophobic liquid, wherein the particles comprise a core within a shell and the core comprises a hydrophobic polymer into has been imbibed a second hydrophobic liquid, characterised in that the shell comprises a semi-permeable membrane, wherein the particles have been formed by a process defined by claim 10.

38. A method of making a stable dispersion of particles that are uniformly distributed throughout a first hydrophobic liquid, comprising the steps of,
   (a) forming a particulate composition comprising particles having a hydrophobic polymeric core within a shell;
   (b) dispersing the particles into a second hydrophobic liquid, in which the hydrophobic polymeric core is soluble or swellable and which has approximately the same density as the first hydrophobic liquid;
   (c) allowing sufficient time for the second hydrophobic liquid to be imbibed by the hydrophobic polymeric core;
   (d) transferring the particles comprising the second hydrophobic liquid formed in step (c) into the first hydrophobic liquid;
characterised in that the shell comprises a semi-permeable membrane.

39. A method according to claim 38 in which the first and second liquids are substantially the same substance.

40. A method of controlling the release of an active substance comprising by placing into a substrate or environment into which the active substance is to be released a particulate composition comprising particles which having a hydrophobic polymeric core within a shell, said hydrophobic core material comprising the active substance, characterised in that the shell comprises a semi-permeable membrane.

* * * * *